United States Patent [19]

Uchikoshi

[11] Patent Number: 4,939,756

[45] Date of Patent: Jul. 3, 1990

[54] TWO-PHASE ENCODER CIRCUIT

[75] Inventor: Gohji Uchikoshi, Higashimurayama, Japan

[73] Assignee: Nakamichi Corporation, Kodaira, Japan

[21] Appl. No.: 260,879

[22] Filed: Oct. 21, 1988

[30] Foreign Application Priority Data

Oct. 22, 1987 [JP] Japan .................... 62-161886[U]

[51] Int. Cl.⁵ .................................... H03K 21/02
[52] U.S. Cl. .................................... 377/45; 377/55; 324/165; 340/672
[58] Field of Search .................... 377/45, 55; 324/165; 340/672

[56] References Cited

U.S. PATENT DOCUMENTS

| | | | |
|---|---|---|---|
| 3,943,338 | 3/1976 | Gagniere | 377/45 |
| 4,081,661 | 3/1978 | Durbin | 377/45 |
| 4,142,152 | 2/1979 | Fincher | 377/45 |
| 4,266,215 | 5/1981 | Adams | 377/45 |

Primary Examiner—John S. Heyman
Attorney, Agent, or Firm—Pearne, Gordon, McCoy & Granger

[57] ABSTRACT

A two-phase encoder circuit for detecting a moving status of a moving article in accordance with first and second detecting signals which are input having a phase offset of 90 degrees and having repeated status of "H" and "L" according to the movement of said moving article, wherein the first detecting signal is taken in synchronization with a clock signal and an output received signal is sequentially output while a delay circuit having an input from at least the received signal outputs a delay signal more delayed than the received signal by less than one period of the clock signal, a pulse signal circuit having an input from at least the received signal outputs, a pulse signal in synchronization with an inversion of status of the received signal and the number of pulses of the pulse signal is counted while counted up or down according to the status of the delay signal with the counting operation being made when the second detecting signal has one status of "H" and "L".

3 Claims, 4 Drawing Sheets

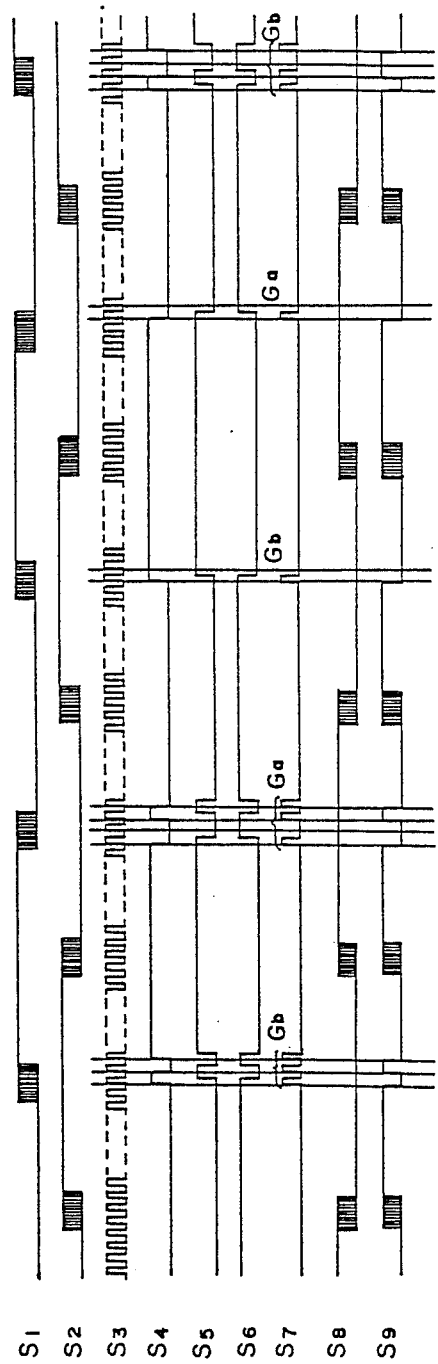

TWO-PHASE ENCODER CIRCUIT

BACKGROUND OF THE INVENTION

A status of a moving article such as rotary angle or revolution of a rotating article has been detected by an apparatus as shown in FIG. 4. The rotating article 15 rotating about a rotary shaft 14 has teeth $15_1$ uniformly on the periphery thereof and two detectors 16a and 16b are disposed close to the teeth of the rotating article 15 to generate rotating signals in accordance with the teeth in a optical or magnetic manner. The detectors 16a and 16b are disposed in an offset manner by 90 degrees relative to the teeth $15_1$ to also detect a rotary direction of the rotating article.

However, rotation detecting signals comprising two value signals of "H" and "L" detected by the detectors 16a and 16b sometimes include chattering noise when the status is reversed, which causes the rotary angle of the rotating article (including the revolution thereof) to be detected, with the result that the two-phase encoder erroneously counts the detecting pulse signals.

In a prior art, there has been tried a method of reforming the signals by a Schmitt trigger circuit after a frequency range of noise component is removed from the signals by a low-pass filter.

In such a method, however, not only the countable frequency is lowered, but also erroneous pulses occur in accordance with the status of operation, all of which is disadvantageous for the two-phase encoder circuit.

SUMMARY OF THE INVENTION

Accordingly, it is a principal object of the invention to provide a two-phase encoder circuit adapted to be accurately operated even though two-phase detected signals include chattering noise when the status is reversed.

It is another object of the invention to provide a two-phase encoder circuit adapted to be inexpensively provided by a simple construction without any low-pass filter and Schmitt trigger circuit.

It is a further object of the invention to provide a two-phase encoder circuit adapted to be operated without lowering the countable frequency.

It is a further object of the invention to provide a two-phase encoder circuit adapted to detect a position of a moving article with high precision.

In accordance with the present invention, there is provided a two-phase encoder circuit for detecting a moving status of a moving article in accordance with first and second detected signals which are input having a phase offset of 90 degrees and having repeated status of "H" and "L" according to the movement of said moving article, the two-phase encoder circuit comprising signal receiving means to receive the first detected signal in synchronization with a clock signal and to sequentially output a received signal, delay means to output a delay signal more delayed than the taking-in signal by a predetermined time of less than one period of the clock signal, pulse signal output means to output pulses in synchronization with an inversion of status of the received signal and an up and down counter to count the number of pulses of the pulse signal while up-counting or down-counting it according to the status of the delay signal with the counting operation being made when the second detected signal has one status of "H" and "L".

BRIEF DESCRIPTION OF THE DRAWINGS

The above and other objects and features of the invention will be apparent from the description of the embodiments of the invention with reference to the accompanying drawings in which;

FIGS. 3A and 3B illustrate waveforms at various parts of the circuit when it is operated.

DETAILED DESCRIPTION OF THE EMBODIMENTS

Figure 1:
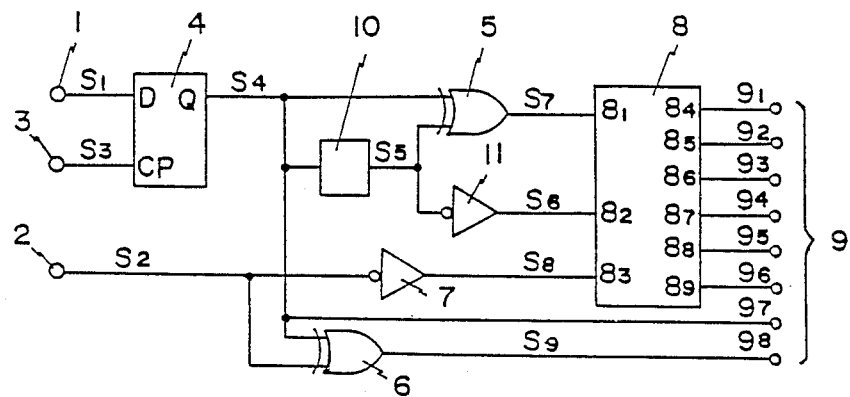
FIG. 1 is a schematic diagram of a two-phase encoder circuit constructed in accordance with one embodiment of the invention.

Referring now to FIG. 1, there is illustrated a two-phase encoder circuit constructed in accordance with one embodiment of the invention.

A rotation detecting signal $S_1$ detected by the detector 16a is input to an input terminal 1, which is connected to a D input terminal of a D type flip-flop circuit (referred to as DFF circuit hereinafter) 4.

A clock pulse signal (referred to as CP signal hereinafter) $S_3$ having a period shorter than the minimum period of the rotation detecting signal $S_1$ is input to an input terminal 3, which is connected to a CP input terminal of the DFF circuit 4.

A Q output terminal of the DFF circuit 4 is connected to one of the input terminals of an exclusive OR circuit (referred to as E-OR circuit hereinafter) 5 and also to one of the input terminals of an E-OR circuit 6. Also, the Q output terminal of the DFF circuit 4 is connected to an input terminal of a delay circuit 10 and also to an output terminal $9_7$ of an output apparatus 9.

An output terminal $S_5$ of the delay circuit 10 is connected to another input terminal of the E-OR circuit 5 and also through an inverter 11 to an up-down signal input terminal $8_2$ of a 6-bit binary up and down counter 8.

Figure 4:
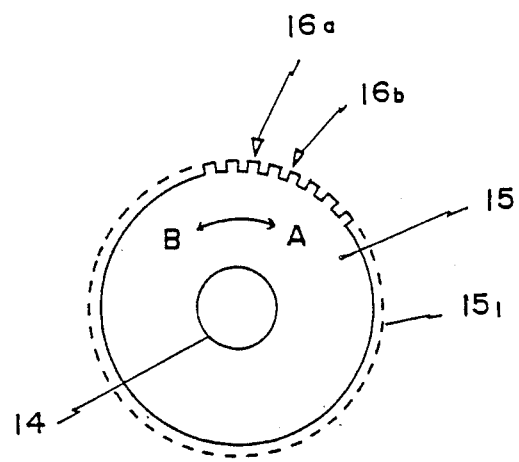
FIG. 4 is a front view of an apparatus for generating rotation detecting signals.

A rotation detecting signal $S_2$ detected by the detector 16b of FIG. 4 is input to an input terminal 2, which is connected to another input terminal of the E-OR circuit 6 and also through an inverter 7 to an ENABLE input terminal $8_3$ of the up-down counter 8.

An output terminal of the E-OR circuit 5 is connected to a pulse signal input terminal $8_1$ of the up-down counter 8 while an output terminal of the O-ER circuit 6 is connected to an output terminal $9_8$ of the output apparatus 9. Output terminals $8_4$ through $8_9$ of the up-down counter 8 having 6 bit binary signals output therefrom are connected to output terminals $9_1$ through $9_6$, respectively.

An operation of the two-phase encoder circuit will be described hereinbelow,

FIG. 3A shows waveforms of signals at various parts of the two-phase encoder circuit when the rotating article 15 rotates in a direction of A as viewed in FIG. 4. The rotation detecting signal $S_1$ detected by the detector 16a has a delay phase of 90 degrees relative to the phase of the rotation detecting signal $S_2$ detected by the detector 16b. Let it be supposed that chattering noises occur when the status of the rotation detecting signals is reversed.

The DFF circuit 4 takes in the rotation detecting signal in synchronization with the rise of the CP signal $S_3$ and sequentially outputs received signal $S_4$ from the Q output terminal thereof. Thus, the received signal $S_4$ has repetitive status of "H" and "L" in accordance with received timing when the status thereof is reversed and the chattering noises of the rotation detecting signal $S_1$ occur, but has the status identical to that of the rotation detecting signal $S_1$ when otherwise.

The delay circuit 10 inputs the received signal $S_4$ and outputs a delay signal $S_5$ delayed by half period of the CP signal $S_3$.

The E-OR circuit 5 outputs an inversion pulse signal $S_7$ which is an E-OR signal of the received signal $S_4$ and the delay signal $S_5$. It will be noted that the inversion pulse signal $S_7$ is synchronized with the inversion of the status of the received signal $S_4$ and has the number of pulses identical to the number of inversions. Thus, it will be also noted that the pulses of the inversion pulse signal $S_7$ occur when the status of the rotation detecting signal $S_1$ is inverted and the inversion pulse signal $S_7$ has the number of pulses varying in accordance with the occurrence status of the chattering noises, but the respective groups G of pulses occurring when the status is inverted have an odd number of pulses, as shown in FIG. 3A.

On the other hand, the inverter 11 outputs up-down signals $S_6$ which are provided by inverting the delay signal $S_5$. The inversion of the status of the up-down signal $S_6$ is delayed relative to the occurrence of pulses of the inversion pulse signal $S_7$.

The up-down counter 8 inputs the up-down signal $S_6$, the inversion pulse signal $S_7$, and a prohibition signal $S_8$ which is an inversion of the rotation detecting signal $S_2$, respectively. The up-down counter 8 counts down at the status of "H" of the up-down signal $S_6$ every time the pulses of the pulse signal $S_7$ are input, while it counts up at the status of "L" of the up-down signal $S_6$ every time the pulses of the pulse signal $S_7$ are input. It should be noted that the operation is made only when the prohibition signal $S_8$ has the status of "H", but not when it has the status of "L".

The inversion pulse signal $S_7$ occurring on the inversion of the status of the rotation detecting signal $S_1$ alternatively has the pulse groups Ga occurring in accordance with the conversion from the status of "H" to that of "L" with the first pulse occurring at the status of "L" of the up-down signal $S_6$ and the pulse groups Gb occurring in accordance with the conversion from the status of "L" to the status of "H" with the first pulse occurring at the status of "H" of the up-down signal $S_6$. However, in case that the rotating article 15 rotates in a clockwise direction A as viewed in FIG. 4, the prohibition signal $S_8$, which is the inversion of the rotation detecting signal $S_2$, is always at the status of "L" when the pulse groups Gb appear and therefore the pulses of the pulse groups Gb are never counted. Thus, the up-down counter 8 counts only the pulses of the pulse groups Ga. Accordingly, the up-down counter 8 counts up by one every time the pulse groups Ga are input and therefore every one period of the rotation detecting signal $S_1$ although it counts up or down in accordance with the status of the up-down signal $S_6$.

Furthermore, the up-down counter 8 outputs the counting results as the binary 6 bit signal from the output terminal $8_4$ through $8_9$ thereof. The output terminals $8_4$ and $8_9$ correspond to the MSB and LSB, respectively.

The output apparatus 9 has terminals $9_7$ and $9_8$ other than the output terminals $9_1$ through $9_6$ connected to the output terminals $8_4$ through $8_9$ of the up-down counter 8, respectively.

The received signal $S_4$ output from the terminal $9_7$ is kept at the status of "L" when the pulse groups Ga of the inversion pulse signal $S_7$ terminate while they are kept at the status of "H" when the pulse groups Gb terminate. On the other hand, the inversion signal $S_9$ which is the E-OR signal of the received signal $S_4$ and the rotation detecting signal $S_2$ have repetitive status inversions every inversion of the status of the signal. Thus, the status inversions are uniformly repeated four times within one period of the rotation detecting signal $S_1$ except for the inversions based on the chattering noises of the rotation detecting signals $S_1$ and $S_2$ and are kept at the status of "L" when the pulse groups Ga terminate. Since the binary 2 bit signals by which the inversion signal $S_9$ and the received signal $S_4$ are expressed are counted up at the sequence of 0, 1, 2 and 3 while the up-down counter 8 counts up by one, the binary 8 bit signals are output from the respective terminals of the output apparatus 9 as the result.

Figure 3B:
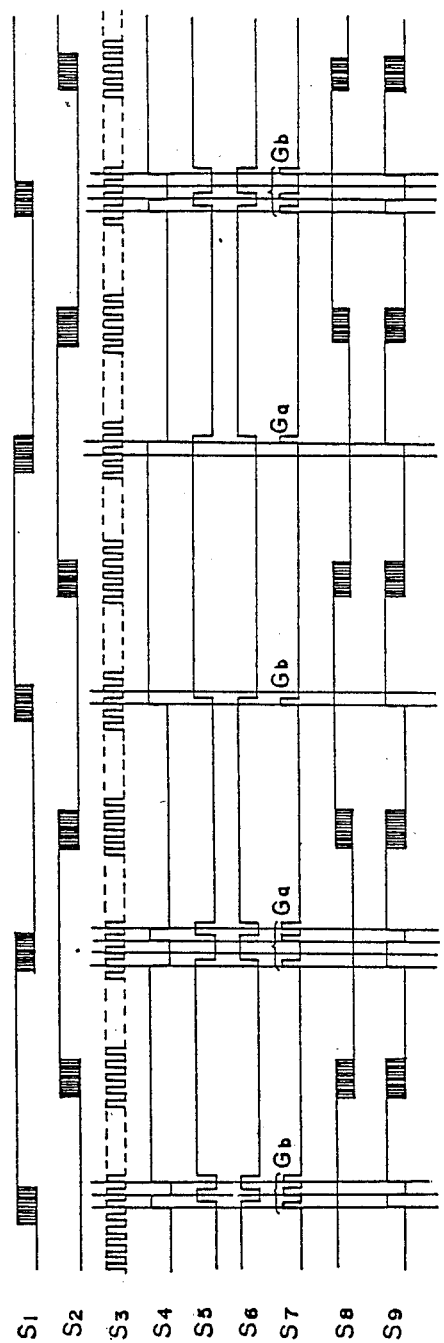

FIG. 3B shows waveforms of signals at various parts of the two-phase encoder circuit when the rotating article 15 rotates in a counterclockwise direction B as viewed in FIG. 4. The rotation detecting signal $S_1$ detected by the detector 16a has an advance phase of 90 degrees relative to the phase of the rotation detecting signal $S_2$ detected by the detector 16b. Let it be also supposed that chattering noises occur when the status of the rotation detecting signals is reversed.

The description of the operation is omitted because the operative conditions of the parts of the circuit are identical to those of the aforementioned operation. The prohibition signal $S_8$ are at the status of "L" and "H", respectively, when the pulse groups Ga and Gb appear. Thus, the up-down counter 8 counts only the pulses of the pulse groups Gb. Accordingly, the up-down counter 8 counts down by one every time the pulse groups Gb are input and therefore every one period of the rotation detecting signal $S_1$ although it counts up or down in accordance with the status of the up-down signal $S_6$. Furthermore, the received signal $S_4$ output from the terminal $9_7$ of the output apparatus 9 is kept at the status of "L" and "H", respectively, when the respective pulse groups Ga and Gb terminate. On the other hand, the inversion signal $S_9$ repeated four times within one period of the rotation detecting signal $S_1$ is kept at the status of "H" when the pulse group Gb terminates. Accordingly, since the binary 2 bit signals by which the inversion signal $S_9$ and the received signal $S_4$ are expressed are counted down at the sequence of 3, 2, 1 and 0 while the up-down counter 8 counts down by one, the binary 8 bit signals are output from the respective terminals of the output apparatus 9 as the result.

Figure 2:
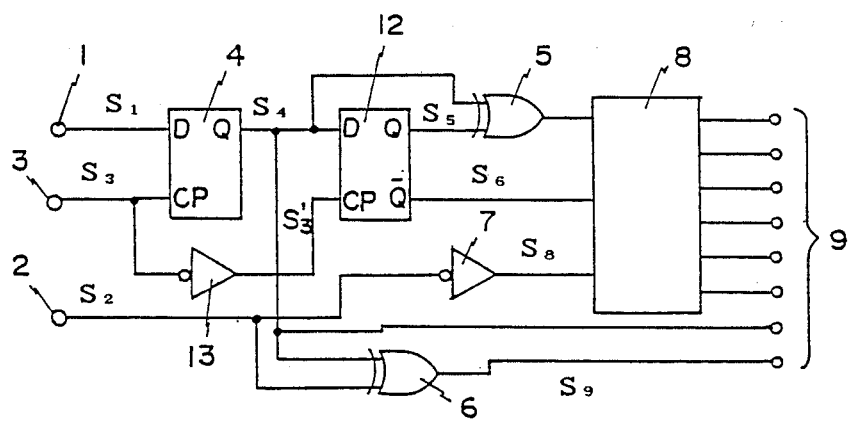
FIG. 2 is a schematic diagram of a two-phase encoder circuit constructed in accordance with another embodiment of the invention.

FIG. 2 shows the two-phase encoder circuit constructed in accordance with another embodiment of the invention. The construction of the circuit of FIG. 2 is identical to that of FIG. 1 except that the delay circuit 10 and the inverter 11 of FIG. 1 for generating the delay signals $S_5$ and the up-down signals $S_6$, respectively, are replaced by an inverter 13 and a D type flip-flop circuit (referred to as DFF circuit) 12.

The CP signal $S_3$ is input to the CP input terminal of the DFF circuit 12 after it is inverted by the inverter 13. Thus, since the DFF circuit 12 sequentially takes in and outputs the received signal $S_4$ output from the DFF circuit 4 at the fall time of the CP signal $S_3$, the output signal from the Q terminal is delayed by half period of the CP signal $S_3$ relative to the received signal $S_4$ and becomes a signal identical to the delay signal $S_5$ while the output signal from the $\overline{Q}$ output terminal becomes the signal identical to the up-down signal $S_6$.

Since the other operation is identical to that of the two-phase encoder circuit of FIG. 1, the description of the operation will be omitted.

There's always an odd number of pulses when the rotating article 15 passes an area where noises are generated on inversion of status of the rotation detecting signals $S_1$ and $S_2$, but if the rotary direction of the rotating article is reversed within the noise area, there's an even number of pulses only at the noise area. In addition thereto, since the pulses are alternately counted up and down, there advantageously occurs no erroneous count on such a transitional condition.

Although two embodiments of the invention have been illustrated and described with reference to the accompanying drawings, it will be understood by those skilled in the art that they are by way of example, and that various changes and modifications may be made without departing from the spirit and scope of the invention. Another method of outputting the signals from the up-down counter may be selected, for example. Although, in the illustrated embodiments, the rotary angle and the revolution of the rotating article can be detected from the counting number of the up-down counter by disposing two detectors close to the rotating article, the distance by which a moving article running along a predetermined guide moves can be detected by disposing two detectors on the moving article and providing a detected member on the guide. Thus, it should be noted that the invention is intended to be defined only by the appended claims.

What is claimed is:

1. A two-phase encoder circuit for detecting the status of an article moving in first or second directions in accordance with first and second detecting signals which are input having a phase offset of 90 degrees and having repeated status of "H" and "L" according to either direction in which said article moves, the two-phase encoder circuit comprising signal receiving means connected to receive the first detecting signal in synchronization with a clock signal and to sequentially output a received signal, delay means connected to input at least the received signal and to output a delay signal more delayed than the received signal by a predetermined time less than one period of the clock signal, pulse signal output means connected to input at least the received signal and to output pulses in synchronization with an inversion of status of the received signal, and an up and down counter connected to input the pulse signal, either of the delay signal and a signal indicating a status thereof and either of the second detecting signal and a signal indicating a status thereof, respectively, and to count the number of pulses of the pulse signal while up-counting or down-counting it according to the status of the delay signal with the counting operation being made when the second detecting signal has one status of "H" and "L".

2. A two-phase encoder circuit as set forth in claim 1, and wherein said signal receiving means comprising a D type flip-flop circuit having input terminals to which said first detecting signal and said clock signal are input, respectively, and an output terminal from which said received signal is output.

3. A two-phase encoder circuit as set forth in claim 1, and wherein said delay means comprises a D type flip-flop circuit having a D input terminal to which said received signal is input and a CP input terminal to which a signal provided by inverting said clock pulse signal is input and having an output terminal from which a delay signal is output.

* * * * *

UNITED STATES PATENT AND TRADEMARK OFFICE
CERTIFICATE OF CORRECTION

PATENT NO. : 4,939,756

DATED : July 3, 1990

INVENTOR(S) : Gohji Uchikoshi

It is certified that error appears in the above-identified patent and that said Letters Patent is hereby corrected as shown below:

Column 1, line 59, delete "taking-in" and insert --received--.

Column 5, line 11, delete "There's always" and insert --There always occur--.

Column 5, line 15, delete "there's an" and insert --there occur an--.

Signed and Sealed this

Ninth Day of June, 1992

Attest:

DOUGLAS B. COMER

*Attesting Officer*     *Acting Commissioner of Patents and Trademarks*